United States Patent [19]

Ishiguro et al.

[11] 4,179,710
[45] Dec. 18, 1979

[54] PREDICTIVE ENCODER WITH A NON-LINEAR QUANTIZING CHARACTERISTIC

[75] Inventors: Tatsuo Ishiguro; Norio Suzuki; Yukihiko Iijima, all of Tokyo, Japan

[73] Assignee: Nippon Electric Co., Ltd., Tokyo, Japan

[21] Appl. No.: 771,048

[22] Filed: Feb. 22, 1977

[30] Foreign Application Priority Data

Feb. 23, 1976 [JP] Japan ................................. 51-19294
Jun. 11, 1976 [JP] ........................................... 51-68521

[51] Int. Cl.$^2$ ......................... H04N 5/40; H04N 9/40
[52] U.S. Cl. ............................ 358/135; 179/15.55 R; 358/13
[58] Field of Search ............... 358/133, 113, 135, 260, 358/261; 179/15.55; 340/397; 364/852, 854, 857

[56] References Cited

U.S. PATENT DOCUMENTS

| | | | |
|---|---|---|---|
| 2,733,410 | 1/1956 | Goodall | 340/347 P |
| 2,905,756 | 9/1959 | Graham | 358/135 |
| 3,277,318 | 10/1966 | Bedford | 364/854 |
| 3,439,753 | 4/1969 | Mounts et al. | 358/135 |
| 3,444,362 | 5/1969 | Pearlman | 364/857 |
| 3,769,451 | 10/1973 | Connor | 358/135 |
| 3,825,832 | 7/1974 | Frei et al. | 358/135 |
| 3,921,204 | 11/1975 | Thompson | 358/13 |
| 3,937,871 | 2/1976 | Robinson | 358/135 |
| 3,973,081 | 8/1976 | Hutchins | 179/15.55 R |
| 3,981,005 | 9/1976 | Takayama et al. | 340/347 AD |
| 4,023,199 | 5/1977 | Netravali et al. | 358/135 |

OTHER PUBLICATIONS

Analog Devices Inc: A/D Conversion Handbook, Norwood, MA., Jun. 1972, pp. I-64/65.

*Primary Examiner*—Felix D. Gruber
*Attorney, Agent, or Firm*—Sughrue, Rothwell, Mion, Zinn and Macpeak

[57] ABSTRACT

A predictive encoder is disclosed which has a non-linear quantizing characteristic. The transmission gain of the quantizer is less than unity when the amplitude component of the predictive error signal is smaller than a predetermined level and is substantially equal to unity when the amplitude component of the predictive error signal is higher than the predetermined level. As a result, undesired redundancy components are effectively suppressed without causing an increase in quantizing noise and a deterioration in information quality.

6 Claims, 5 Drawing Figures

PREDICTIVE ENCODER WITH A NON-LINEAR QUANTIZING CHARACTERISTIC

BACKGROUND OF THE INVENTION

This invention relates to a predictive encoder for use in a predictive code communication system.

A predictive code communication system is suitable for the efficient transmission of highly redundant signals such as a television video signal which has high correlations. Such system is generally classified into three systems: an intraframe code communication system, an interframe code communication system, and a combined predictive code communication system. In the intraframe and interframe code communication systems, the preceding sample feedback is used to produce predictive error signals. The correlation of the television signal permits the preceding samples as predicted samples. More specifically, the predictive error signal is provided by feeding back the samples of a preceding frame for comparison and subtraction. In the combined predictive code communication system, use is made of the interframe prediction and of intraframe prediction, the correlation in the latter being taken within a frame between, for example, two successive scanning lines.

In these systems, the predictive error signal has an amplitude distribution concentrated in a small amplitude region so that the information codes for smaller quantization levels appear more frequently to result in another kind of redundancy. To avoid such redundancy, variable length codes may be used assigning a code of shorter length to frequently occurring quantization levels.

The use of variable length codes makes it possible to decrease the amount of information to be transmitted by one bit per sample on the average as compared with the ordinary transmission by equal length codes. In practice, the decrease varies from zero to about two bits depending on the nature of the signal. A buffer memory is therefore used to temporarily store the variable length codes before transmitting them at a predetermined transmission bit rate. Overflow of the buffer memory is nevertheless inevitable for a signal portion carrying much information, namely, for rapidly varying information, when use is made of a transmission rate suitable to an average amount of the information.

In order to avoid the overflow, proposals have been made to change the quantization characteristics, e.g., to make it coarse or to reduce the number of the quantization steps depending on the amount of information. The changes in the quantization characteristics, however, deteriorate the quantization noise or strengthen the overload distortion to degrade the transmitted picture at the edge portion.

With the combined predictive encoding system, the highly effective interframe prediction can be expected with respect to a still-motion television signal and the highly effective intraframe prediction can be expected with respect to a television signal for a rapidly moving picture. In this system, however, a great amount of feedback is necessary to eliminate random noise and quantizing noise through a correlation operation. If the amount of feedback is not sufficient, the increase in the undesired redundancy components cannot be avoided in information to be transmitted.

In order to reduce such redundancy components, proposals have been made to insert an attenuating circuit having a gain less than 1 or a low pass filter in the interframe predictive loop. The insertion of such circuit elements, however, causes deterioration in picture such as blur at moving portions.

SUMMARY OF THE INVENTION

It is therefore an object of this invention to provide a predictive encoder in which such undesired redundancy components are effectively suppressed without causing an increase in quantizing noise and a deterioration in picture quality.

A predictive encoder according to this invention comprises means for producing a predictive signal, means responsive to an input signal and the predictive signal for producing a predictive error signal representing a difference therebetween, and a quantizer responsive to the predictive error signal and having a non-linear quantization characteristic for producing information codes. The non-linear characteristic for the quantizer is accomplished with a transmission gain set at a value smaller than unity within a sufficiently small amplitude range and at a value substantially equal to unity for amplitude ranges beyond said sufficiently small amplitude range.

With this invention, the amplitude distribution for the predictive error signal is concentrated in a smaller amplitude region by passing the predictive error signal through the non-linear quantizer, whereby the information codes can be reduced. Even if the minute waveform distortion is introduced by the non-linear characteristic, it is hardly detected as deterioration. Further, the quantization noise does not increase, because the quantization steps are made finer than or at least equal to the conventional system.

In the combined predictive encoder according to this invention, because the interframe predictive error signal for the still-motion picture is small, the amplitude thereof is suppressed. Therefore, the noise components are also suppressed. On the other hand, the interframe error signal for a rapidly moving picture, which is of relatively high level, is encoded without resort to the amplitude suppression, whereby the blur can be prevented.

BRIEF DESCRIPTION OF THE DRAWINGS

The above and other objects, features and advantages of this invention will become more apparent from the following description when taken in conjunction with the accompanying drawings, wherein.

DESCRIPTION OF THE PREFERRED EMBODIMENTS

Figure 1:
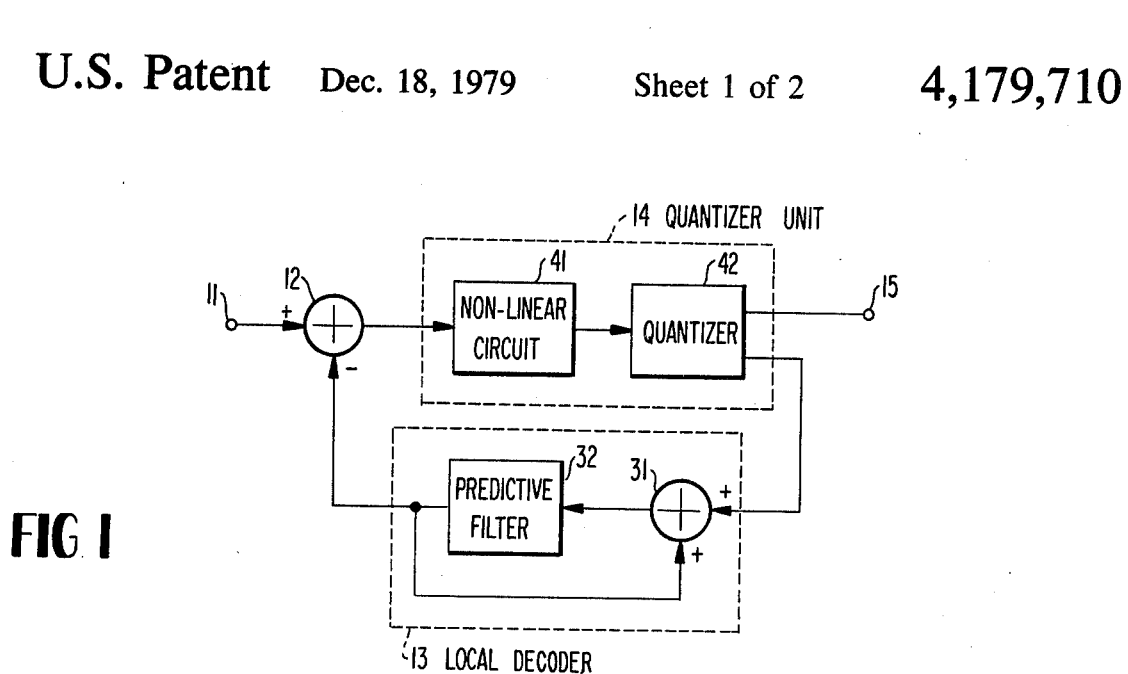
FIG. 1 is a block diagram of a predictive encoder according to a first embodiment of this invention.

Referring to FIG. 1, a predictive encoder according to a first embodiment of this invention comprises an input terminal 11 to which an input television video signal is supplied to be encoded by the encoder. A subtractor 12 subtracts an output signal (predictive signal)

of a local decoder 13 from the input signal to produce a predictive error signal, which is subsequently quantized by a quantizer unit 14. The decoder 13 comprises an adder 31 for calculating the sum of the quantized predictive error signal and the predictive signal, and a predictive filter 32 supplied with the adder output signal (locally demodulated signal) to produce the demodulator output signal as the next predictive signal. Predictive characteristics for the predictive filter 32 may be of interframe or intraframe predictive characteristics.

Figure 2:
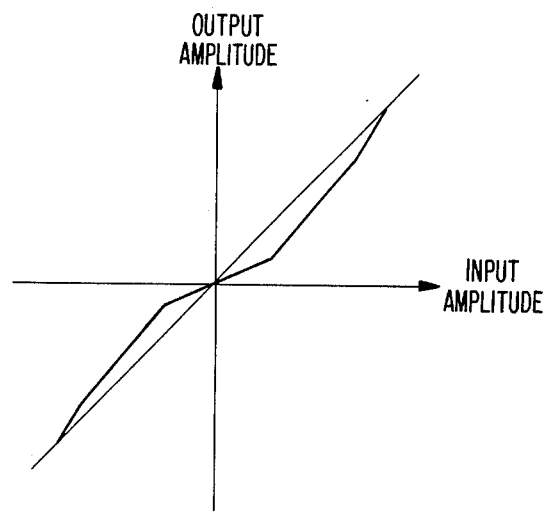
FIG. 2 shows an example of non-linear characteristic for a quantizer employed in the first embodiment.

Referring more specifically to FIG. 1, the quantizer unit 14 comprises in accordance with a first embodiment of this invention a non-linear circuit 41 and a quantizer 42 for quantizing a non-linear output signal of the non-linear circuit 41 successively into the quantized predictive error signal and information codes. The non-linear circuit 41 has a non-linear gain characteristic as shown in FIG. 2, in which the abscissa represents the input amplitude level and the ordinate represents the output amplitude level. More specifically, the transmission gain of the non-linear circuit 41 is less than unity for the small input amplitude range and is substantially equal to unity for such amplitude range where the amplitude of the input predictive error signal is higher than a predetermined amplitude level. The quantizer 42 may be of a read-only memory (ROM) responsive to the non-linear output signal supplied thereto as an address signal for producing the quantized predictive error signal and the information codes. The two outputs of the quantizer 42 are the quantized predictive error signal and the information codes, respectively. The information codes are of equal length and are supplied to an output terminal 15 to be transmitted to a receiver (not shown).

Figure 3:
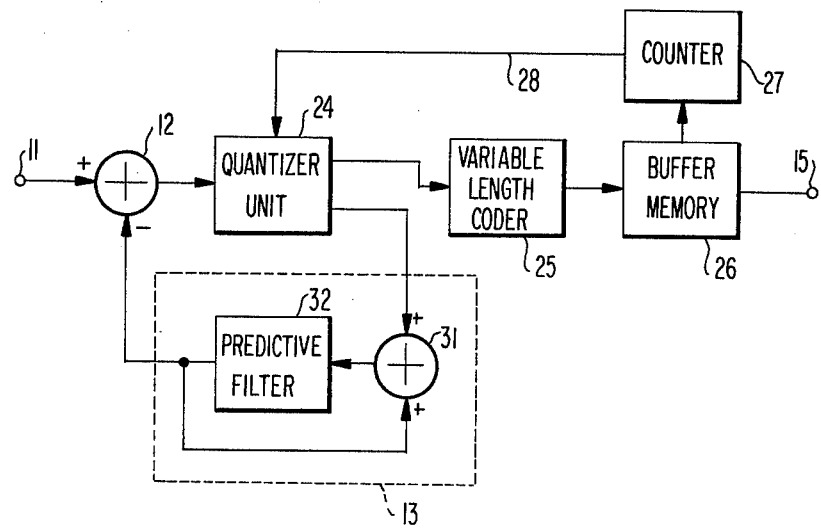
FIG. 3 is a block diagram of a predictive encoder according to a second embodiment of this invention.

Referring to FIG. 3, a predictive encoder according to a second embodiment of this invention comprises the input terminal 11, the subtractor 12, the local decoder 13 and a quantizer unit 24. The elements 11, 12 and 13 are identical to those of like reference numerals shows in FIG. 1. The quantizer unit 24 has in accordance with a second embodiment a plurality of non-linear gain characteristics mutually different from each other. As will be described later, the quantizer unit 24 selects one of the plurality of non-linear gain characteristics. The output signal of the quantizer unit 24 is supplied to a variable length coder 25 for converting the quantizer output signal of equal length codes into variable length codes, which are temporarily stored in a buffer memory 26 and supplied to the output terminal 15 at a predetermined bit rate to be transmitted.

As described in U.S. Pat. No. 4,027,100 the buffer memory 26 is accompanied by a device or counter 27 for producing a buffer occupancy or status signal indicative of buffer occupancy of the buffer memory 26. The buffer status signal is supplied to the quantizer unit 24 through a connection 28 to select the non-linear gain characteristics. The buffer status signal may be produced by sampling the buffer occupancy once for every field interval or once for each integral fraction of the field interval. It should be noted here that the buffer memory 16 has a sufficient capacity. For example, let it be desired to achieve a balance for each field of a television signal between the number of bits read into the buffer memory 26 and those read out thereof. For a sampling frequency of 10.74 MHz and an average code length of three bits, the buffer occupancy increases by about 180 kilobits during one field interval when an increase of one bit per sample occurs on the average.

The buffer memory 26 should have a capacity of about 200 to 300 kilobits under these circumstances. It is now understood in conjunction with the second embodiment that one of the plurality of non-linear gain characteristics is selected in accordance with the buffer status signal so that when amounts of encoded information and the stored information of the buffer memory 26 are small, thr quantizer unit 24 quantizes the predictive error signal with a linear gain characteristic, and the degree of the non-linear characteristic becomes high with the increase of the stored information.

Figure 4:
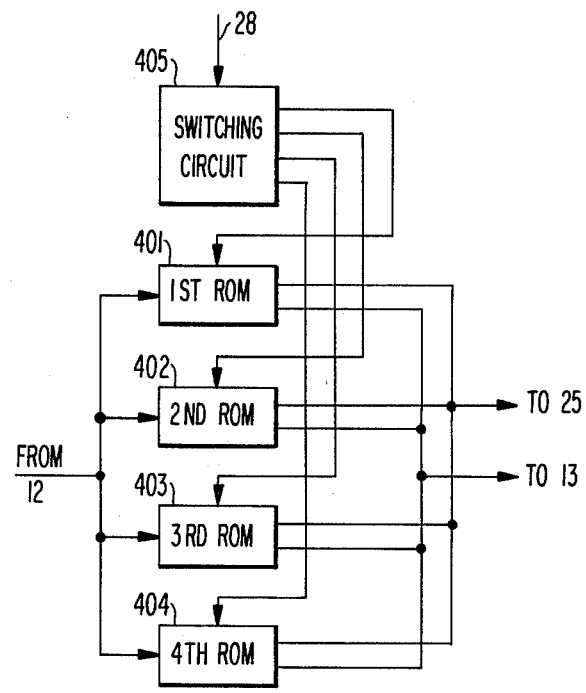
FIG. 4 is a block diagram of a quantizer employed in the second embodiment.

Referring to FIG. 4, the quantizer unit 24 comprises first through fourth read-only memories 401, 402, 403, and 404 having different quantization characteristics, and a switching circuit 405 responsive to the buffer status signal for selectively supplying the predictive error signal from the subtractor 12 to a selected one of the read-only memories 401-404. The read-only memory 401 operates as a linear quantizer having a linear quantization characteristic and is selected when the buffer status signal represents a sufficiently small amount of the stored information in the buffer memory 26.

With the second embodiment, it is possible to transmit the buffer status signal to a receiver of the predictive code communication system either by adding the same as a mode signal to each of the frame synchronizing signals interspersed at the variable length coder 25 in a variable length codes or by adding the same to pertinent ones of the horizontal synchronizing signals. The second embodiment makes it possible to control the amount of information by practically stepwise heightening the degree of the non-linear characteristic when the buffer occupancy unduly increases.

Figure 5:
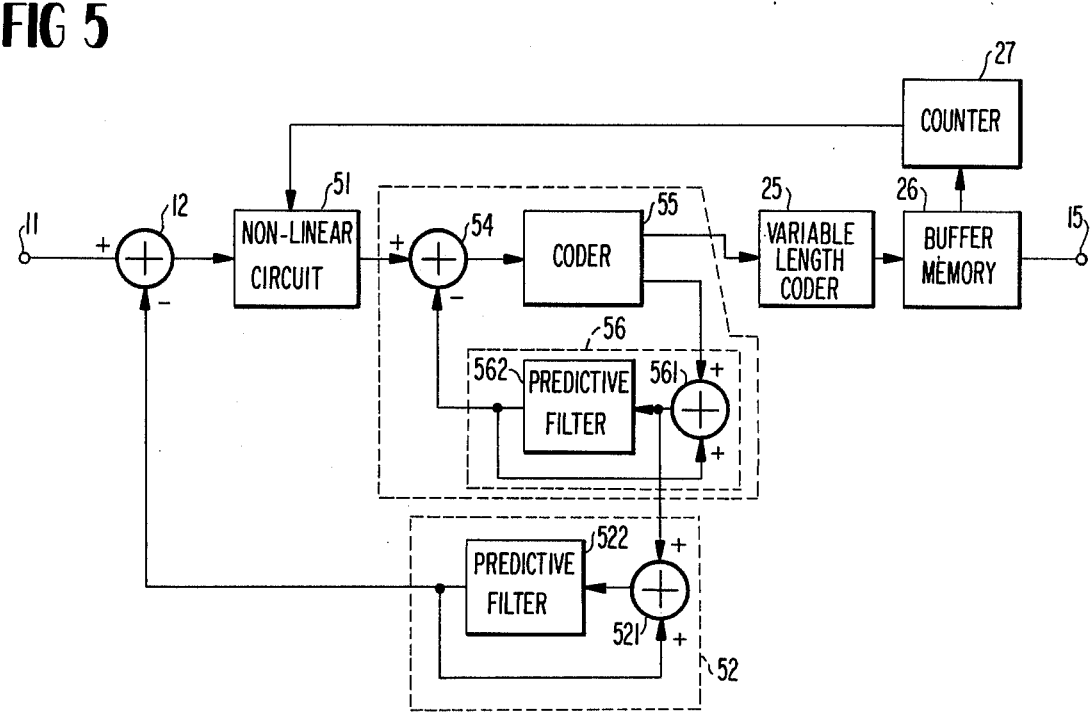
FIG. 5 is a block diagram of a composite predictive encoder according to a third embodiment of this invention.

Referring to FIG. 5, a combined predictive encoder according to a third embodiment comprises an input terminal 11, a subtractor 12, a non-linear circuit 51 having a plurality of non-linear gain characteristics, an interframe local decoder 52, and intraframe predictive coder 53, a variable length coder 25, a buffer memory 26, a counter 27, and an output terminal 15. The elements 11, 12, 25, 26, 27, and 15 are identical to those of like reference numerals shown in FIGS. 1 and 3. The intraframe coder 53 comprises an adder 54, a coder 55, and an intraframe local decoder 56, and may be of a conventional intraframe coder. The interframe and intraframe local decoders 52 and 56 have similar construction to the local decoder 13 shown in FIG. 1, and comprise adders 521 and 561, and predictive filters 522 and 562, respectively.

The subtractor 12 subtracts an output interframe predictive signal of the interframe local decoder 52 from the input signal to produce an interframe predictive error signal, which is supplied to the non-linear circuit 51. The non-linear circuit 51 comprises a linear amplifier, a plurality of non-linear amplifiers having different non-linear gain characteristics, and a switching circuit responsive to the buffer status signal for selectively supplying the interframe predictive error signal to a selected one of the amplifiers. Each of the amplifiers may be a read-only memory responsive to the interframe predictive error signal supplied thereto as an address signal.

The output signal of the non-linear circuit 51 is supplied to the adder 54, which is also supplied with the intraframe predictive signal from the intraframe local decoder 56 to produce a combined predictive error signal. The composite predictive error signal is supplied to the coder 55 identical to the quantizer 42 shown in FIG. 1, and coded to the information codes of equal length codes. The information codes are supplied to the variable length coder 25 for converting the same into variable length codes, which are temporarily stored in a buffer memory 26 and supplied to the output terminal 15.

The coded combined predictive error signal is supplied to the intraframe local decoder 56 to produce the intraframe locally decoded signal as the next intraframe predictive signal. The output signal of the adder 561 is supplied to the interframe local decoder 52 to produce the interframe locally decoded signal as the next interframe predictive signal.

It should be noted that the non-linear circuit 51 can be constructed by a single non-linear amplifier identical to the non-linear circuit 41 shown in FIG. 1. In this case, the counter 27 is omitted. Further, in case where the information codes are transmitted to the receiver without converting into variable length codes, the variable length coder 25 is omitted.

What is claimed is:

1. A predictive encoder for encoding an input signal of high correlation by the use of correlation techniques, said encoder comprising:
   means for producing a predictive signal corresponding to the amplitude value to said input signal at a preceding sample;
   means supplied with said input signal and said predictive signal in a timed relation for producing a predictive error signal representing the difference therebetween; and
   quantizer means for quantizing said predictive error signal to produce information codes, said quantizer means including a plurality of circuits having different non-linear characteristics wherein said circuits are read-only memories which produce information codes according to respective ones of said different non-linear characteristics, the transmission gain of said quantizer means being less than unity when the amplitude component of said predictive error signal is smaller than a predetermined level and being substantially equal to unity when said amplitude component of said predictive error signal is higher than said predetermined level.

2. A predictive encoder as claimed in claim 1, further comprising means for converting said information codes into variable length codes; and buffer memory means for temporarily storing said variable length codes for readout at a predetermined bit rate.

3. A predictive encoder as claimed in claim 1, wherein said buffer memory means includes means for producing a buffer status signal indicative of buffer occupancy of said buffer memory means, said quantizer means including control means responsive to said buffer status signal for selecting one of said plurality of non-linear characteristics.

4. A predictive encoder as claimed in claim 3 wherein said quantizer means further includes an intraframe predictive coder providing outputs to said means for producing a predictive signal and to said means for converting said information codes into variable length codes, said means for producing a predictive error signal being an interframe local decoder.

5. A predictive encoder as claimed in claim 4 wherein said intraframe predictive coder comprises:
   second means for producing a second predictive signal equivalent to its amplitude value to the output of a selected one of said plurality of circuits having different non-linear characteristics;
   second means supplied with said output of a selected one of said plurality of circuits and said second predictive signal in a timed relation for producing a second predictive error signal representing the different therebetween; and
   a coder responsive to said second predictive error signal for producing said information codes.

6. A predictive encoder for encoding an input signal of high correlation by the use of correlation techniques, said encoder comprising:
   means for producing a predictive signal corresponding to the amplitude value to said input signal at a preceding sample;
   means supplied with said input signal and said predictive signal in a timed relation for producing a predictive error signal representing the difference therebetween;
   quantizer means including a plurality of circuits having different non-linear characteristics for quantizing said predictive error signal to produce information codes, the transmission gain of said quantizer means being less than unity when the amplitude component of said predictive error signal is smaller than a predetermined level and being substantially equal to unity when said amplitude component of said predictive error signal is higher than said predetermined level;
   means for converting said information codes into variable length codes;
   buffer memory means for temporarily storing said variable length codes for readout at a predetermined rate and including means for producing a buffer status signal indicative of buffer occupancy of said buffer memory means;
   said quantizer means further including an intraframe predictive coder providing outputs to said means for producing a predictive signal and to said means for converting said information codes into variable length codes, said means for producing a predictive error signal being an intraframe local demodulator, and control means responsive to said buffer status signal for selecting one of said plurality of non-linear characteristics.

* * * * *

UNITED STATES PATENT AND TRADEMARK OFFICE
CERTIFICATE OF CORRECTION

PATENT NO. : 4,179,710
DATED : December 18, 1979
INVENTOR(S) : Tatsuo Ishiguro et al It is certified that error appears in the above-identified patent and that said Letters Patent are hereby corrected as shown below:

Column 3, line 7, delete "demodula-"
line 8, delete "tor" insert --decoder--
line 48, after "in" delete "a"

Column 4, line 68, delete "composite" insert --combined--

Column 6, line 18, delete "different" insert --difference--

Signed and Sealed this

Eighth Day of April 1980

[SEAL]

Attest:

SIDNEY A. DIAMOND

Attesting Officer

Commissioner of Patents and Trademarks